United States Patent [19]

Suzuki

[11] Patent Number: 5,760,896
[45] Date of Patent: Jun. 2, 1998

[54] DISTANCE MEASURING DEVICE

[75] Inventor: Akira Suzuki, Yokohama, Japan

[73] Assignee: Ricoh Company, Ltd., Tokyo, Japan

[21] Appl. No.: 633,403

[22] Filed: Jun. 10, 1996

[30] Foreign Application Priority Data

Jun. 9, 1995 [JP] Japan ................ 7-143553

[51] Int. Cl.$^6$ ............................................. G01C 3/00
[52] U.S. Cl. ......................... 356/3.08; 356/3.14; 396/128
[58] Field of Search ........................ 356/3.08, 3.14, 356/3.15; 250/201.6; 396/128

[56] References Cited

U.S. PATENT DOCUMENTS

| | | | |
|---|---|---|---|
| 4,746,790 | 5/1988 | Sorimachi | 260/201 |
| 4,916,302 | 4/1990 | Sorimachi | 356/1 |
| 4,947,202 | 8/1990 | Kitajima et al. | |
| 5,069,543 | 12/1991 | Kitajima et al. | |
| 5,357,310 | 10/1994 | Kawamura et al. | 354/408 |
| 5,512,997 | 4/1996 | Ogawa | 356/3.04 |

FOREIGN PATENT DOCUMENTS

| | | |
|---|---|---|
| 2 55912 | 2/1990 | Japan . |
| 4 27812 | 1/1992 | Japan . |

*Primary Examiner*—Mark Hellner
*Attorney, Agent, or Firm*—Oblon, Spivak, McClelland, Maier & Neustadt, P.C.

[57] ABSTRACT

To accurately and easily measure distance even when a photographic subject image has contrast portions inclined at various angles, a shift quantity, between a pair of left and right photographic subject images formed by a pair of left and right optical distance measuring systems having a base length, is detected and then a distance up to the photographic subject is measured. Also, the distance measuring device comprises a plurality of upper and lower photoelectric conversion element arrays arranged with respect to a pair of photographic subject images for detecting a pair of photographic subject images of the same portion of the photographic subject, an image information generating section for generating image information in the same direction as an image shift direction of the photographic subject image of the same portion of the photographic subject by processing left image information and right image information converted photoelectrically by the plurality of upper and lower photoelectric conversion element arrays, and an image shift quantity detecting section for detecting a shift quantity of the photographic subject image of the same portion of the photographic subject, based on a pair of left image information and right image information generated. Based on the detected shift quantity, a distance up to the photographic subject is measured.

11 Claims, 9 Drawing Sheets

L1, L3, L5, L7: UPPER SENSOR
L0, L2, L4, L6: LOWER SENSOR
ℓ1, ℓ2, ....ℓ7: SAME PORTION PREDICTED

5,760,896

DISTANCE MEASURING DEVICE

BACKGROUND OF THE INVENTION

1. Field of the Invention

The present invention relates to a passive type distance measuring device using a photoelectric conversion element array and is applicable, for example, to general-purpose cameras, threedimensional image cameras, etc.

2. Description of the Prior Art

As a conventional example of the passive type distance measuring device, an invention is known which is described in Japan Laid-Open Patent Publication No. HEI 4-27812, filed by the inventor of this application. As has been described in this publication, in the conventional distance measuring device, if a base length direction and a detecting direction are not aligned with each other, the measured values of a pair of left and right photoelectric conversion elements will differ in spite of the same photographic subject at the same distance, and errors will occur in the measurement, so that the assembly shift, between the base length direction and the detecting direction, is mechanically adjusted when assembling the device.

However, mechanical adjustment is troublesome and not efficient. Then, as is described in the aforementioned publication or Japan Laid-Open Patent Publication No. HEI 2-55912, there has so far been proposed a method of correcting an error in the distance measurement which occurs due to the shift between the base length direction and the detecting direction.

In the invention as described in Japan Laid-Open Patent Publication No. HEI 2-55912, two upper and lower photoelectric conversion element arrays are arranged in correspondence with a pair of left and right optical systems, respectively. That is, a total of four photoelectric conversion element arrays are arranged. The angle of a photographic subject with respect to the photoelectric conversion element array is calculated by a predetermined correlative method. Then, a correction value is calculated from a vertical shift quantity which has been stored as a correction value in advance and from the angle of the photographic subject with respect to the photoelectric conversion element array. With the calculated correction value, the vertical shift error in a distance measurement signal which is obtained from the photoelectric conversion element array is corrected.

Also, in the invention as described in Japan Laid-Open Patent Publication No. HEI 4-27812, above or below at least one of a pair of left and right photoelectric conversion element arrays, an auxiliary photoelectric conversion element array is disposed in parallel. The result of the measurement of distance, obtained by the pair of left and right photoelectric conversion element arrays, is corrected by the result of the distance measurement obtained by the auxiliary photoelectric conversion element array and the result of the distance measurement obtained by the other photoelectric conversion element array of the aforementioned pair of photoelectric conversion element arrays.

Both of the conventional distance measuring devices, described in the aforementioned publications, correct an error in the distance measurement with respect to the result of the distance measurement calculated, and the distance measurement error occurs due to the vertical shift between images which is caused by the rough inclination of a photographic subject. Therefore, the conventional conversion measuring devices are effective to a photographic subject which has a simple, straight contrast portion (edge).

However, in practice there are few cases where a photographic subject consists of only simple straight contrast portions. In general, the photographic subject includes a wide variety of angular contrast portions, so it is very difficult to accurately and easily make a measurement of distance with respect to photographic subjects consisting of all sorts of shapes.

SUMMARY OF THE INVENTION

The present invention has been made in order to eliminate the aforementioned problems found in the conventional devices. It is not to correct an error in the distance measurement result based on the vertical shift of a photographic subject, but even when the image of the photographic subject has been shifted vertically with respect to photoelectric conversion element arrays due to the principles of measuring distance, the image information of the same portion of the photographic subject is virtually generated by an image information generating section, and distance is calculated by processing the generated image information by a general correlative method.

An object of the present invention is to provide a distance measuring device which is capable of accurately and easily performing a measurement of distance even when a photographic subject consists of all sorts of shapes, including various angular contrast edges.

Another object of the present invention is to provide a distance measuring device which is capable of accurately and easily performing a measurement of distance by proposing photoelectric conversion element arrays which can enhance the correlation between upper image information and lower image information.

Still another object of the present invention is to provide a distance measuring device which is capable of correcting an error based on a vertical image shift which varies according to a variation in the distance of the photographic subject.

A further object of the present invention is to provide a distance measuring device which is capable of measuring distance more accurately by arranging photoelectric conversion element arrays and optical distance measuring systems horizontally and vertically in the form of a cross and using a result of measurement obtained by a distance measuring device which is smaller, between a distance measuring device in a horizontal direction and a distance measuring device in a vertical direction, as to the inclination of the contrast portion of a photographic subject with respect to the photoelectric conversion element arrays.

In accordance with an important aspect of the present invention, there is provided a distance measuring device where measurement of a distance up to a photographic subject or detection of a focal point of an optical photographic system is performed by detecting a shift quantity between a pair of left and right photographic subject images formed by a pair of left and right optical distance measuring systems having a base length.

The distance measuring device comprises a plurality of upper and lower photoelectric conversion element arrays arranged with respect to the pair of photographic subject images for detecting the pair of photographic subject images of the same portion of the photographic subject; an image information generating section for generating image information in the same direction as an image shift direction between the photographic subject images of the same portion of the photographic subject by processing left image information and right image information converted photoelectrically by the plurality of upper and lower photoelectric conversion element arrays; and an image shift quantity detecting section for detecting a shift quantity between the photographic subject images of the same portion of the photographic subject, based on a pair of left image information and right image information generated by the image information generating section.

The measurement of a distance up to a photographic subject or the detection of a focal point of an optical photographic system is performed based on the shift quantity detected by the image shift quantity detecting section.

In a preferred form of the present invention, each array of the plurality of upper and lower photoelectric conversion element arrays may be arranged so that odd and even elements are alternately shifted vertically. Also, a vertical shift quantity, between the elements of the photoelectric conversion element array, may be nearly the same as a pitch between the odd elements or between the even elements.

In another preferred form of the present invention, the image information generating section uses a correlative method per each portion with respect to left and right image outputs of upper photographic conversion elements and lower photographic conversion elements, and obtains the image information of the same portion of the photographic subject by a space between images of each portion obtained from upper image information and lower image information and a correction value determined by each distance measuring device.

In still another preferred form of the present invention, the image information generating section approximates a space between upper image information and lower image information from a value of the upper image information and a value of the lower image information for generating image information of the photographic subject image of the same portion by the upper image information and the lower image information, and obtains the image information of the same portion of the photographic subject by a correction value which is determined by each distance measuring device. By using upper image information LUm and RUm, lower image information LDm and RDm, and a value K which is determined by adjustment shift of the distance measuring device, the left image information Lm and the right image information Rm of the same portion of the photographic subject image are expressed as Lm=KLUm+(1−K)LDm and Rm=(1−K)RUm+KRDm.

A vertical shift quantity Δh between the photographic subject images or a space Ho between the upper and lower photoelectric conversion element arrays is calculated from a result of measurement obtained by using a chart of vertical stripes or lines inclined at an angle of $\pm \tan^{-1} 0.5$.

With a correction value K at the image information generating section, an address I representative of N photoelectric conversion elements arranged horizontally and vertically, and correction coefficients G and S, left and right correction functions are expressed as $K_L$=GI+S and $K_R$=G(N−1)+S. The image information is generated by independently correcting the left image information and the right image information by these correction functions.

When it is judged that the photographic subject has a large number of contrast portions whose inclination exceeds 45 degrees, an instruction is given so that a photographic device, provided with the distance measuring device, is changed to its vertical position for measuring distance.

Upper and lower photoelectric conversion element arrays in two or more rows are arranged horizontally and vertically in the form of a cross, and in correspondence with these arrays, optical distance measuring systems are arranged in the form of a cross.

Between a distance measuring device in a horizontal direction and a distance measuring device in a vertical direction, there may be used a result of measurement of a distance measuring device where many contrast portions of a photographic subject having a small angle with respect to the photoelectric conversion element arrays are distributed.

In the aforementioned arrangement, a pair of left and right photographic subject are formed in a plurality of upper and lower photoelectric conversion element arrays by a pair of left and right optical distance measuring systems. The left image information and the right image information, photoelectrically converted by the plurality of upper and lower photoelectric conversion element arrays, are processed, and then the image information is virtually generated in the same direction as an image shift direction of the photographic subject image of the same portion of the photographic subject. Based on a pair of left image information and right image information generated by the image information generating section, a shift quantity of the photographic subject image of the same portion of the photographic subject is detected. Based on the detected shift quantity, the measurement of a distance up to the photographic subject or the detection of the focal point of the optical photographic system is performed.

DESCRIPTION OF THE PREFERRED EMBODIMENTS

Figure 1:
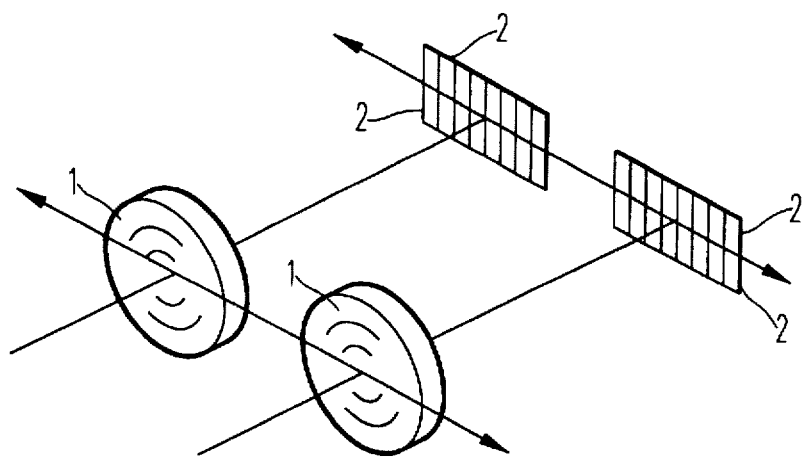
FIG. 1 is a perspective view showing an embodiment of a distance measuring device according to the prevent invention.

A preferred embodiment of the distance measuring device according to the present invention will hereinafter be described referring to the drawings.

FIG. 1 shows the optical layout example of the distance measuring device. In the figure, the distance measuring device has a pair of left and right lenses 1 constituting an optical distance measuring system and photoelectric conversion element arrays 2 disposed behind the lenses 1. The lenses 1 are spaced a predetermined base length apart, and the photoelectric conversion element arrays 2 are arranged according to the base length.

Figure 2:
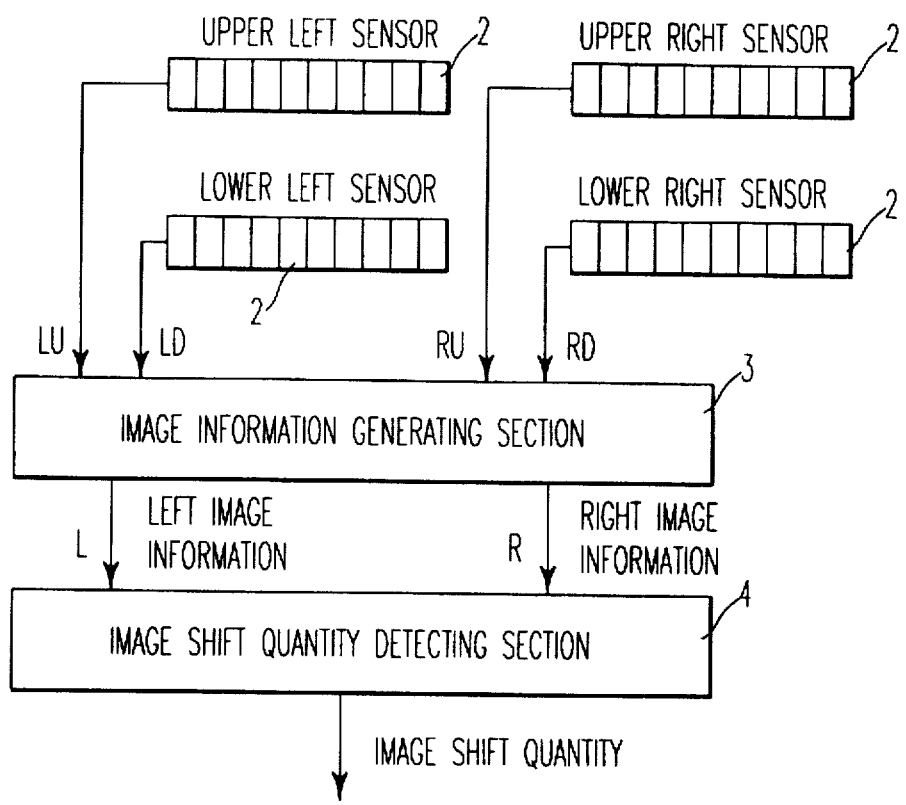
FIG. 2 is a block diagram showing the embodiment of the distance measuring device according to the prevent invention.

As shown in FIG. 2, each of the left and right photoelectric conversion element arrays 2 consists of upper and lower photoelectric conversion element arrays, and the left and right photoelectric conversion element arrays 2 constitute groups of photoelectric conversion element arrays, respectively. Specifically, the photoelectric conversion element arrays 2 comprise a total of four photoelectric conversion element arrays consisting of an upper left sensor, a lower left sensor, an upper right sensor, and a lower right sensor. Each photoelectric conversion element array 2 consists, for example, of a sensor array where a plurality of CCD sensors are arranged in a row. The image information outputs LU, LD, RU, and RD from the respective photoelectric conversion element arrays 2 are input to an image information generating section 3. The image information generating section 3 outputs the left image information L and the right image information R of the same portion of a photographic subject, based on the image information outputs LU, LD, RU, and RD. The left image information L and the right image information R are input to the image offset quantity detecting section 4. The image shift quantity detecting section 4 detects an image shift quantity corresponding to a distance up to a photographic subject from the left image information L and the right image information R. In addition, based on this image shift quantity, the distance up to the photographic subject or the focal point of the photographic optical system of a camera can be detected.

Figure 3:
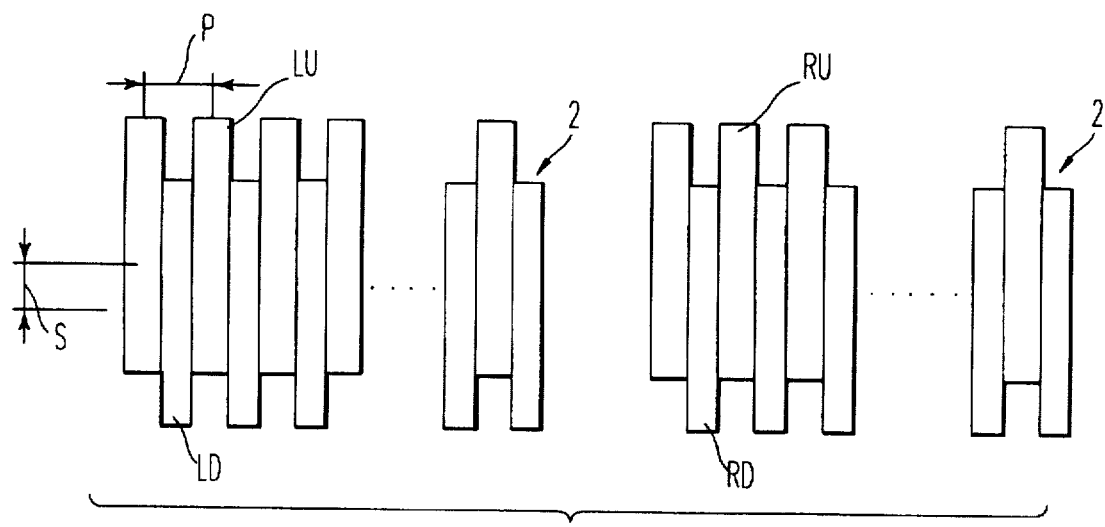
FIG. 3 is a front view showing an example of photoelectric conversion element arrays applicable to the present invention.

FIG. 3 shows an arrangement example of each element of each photoelectric conversion element array 2. When a plurality of photoelectric conversion elements are arranged in a row, the photoelectric conversion elements are alternately shifted up and down and are arranged in the form of a sinking comb. The odd photoelectric conversion elements LU and RU, shifted to the upper side, and the even photoelectric conversion elements LD and RD, shifted to the lower side, constitute upper and lower photoelectric conversion element arrays, respectively. In addition, the upwardly shifted photoelectric conversion element array LU and the downwardly shifted photoelectric conversion element array LD constitute a group of left photoelectric conversion element arrays. Similarly, the upwardly shifted photoelectric conversion element array RU and the downwardly shifted photoelectric conversion element array RD constitute a group of right photoelectric conversion element arrays. The vertical shift quantity of the photoelectric conversion element array is nearly the same as the pitch P between adjacent odd elements or adjacent even elements.

Figure 4:
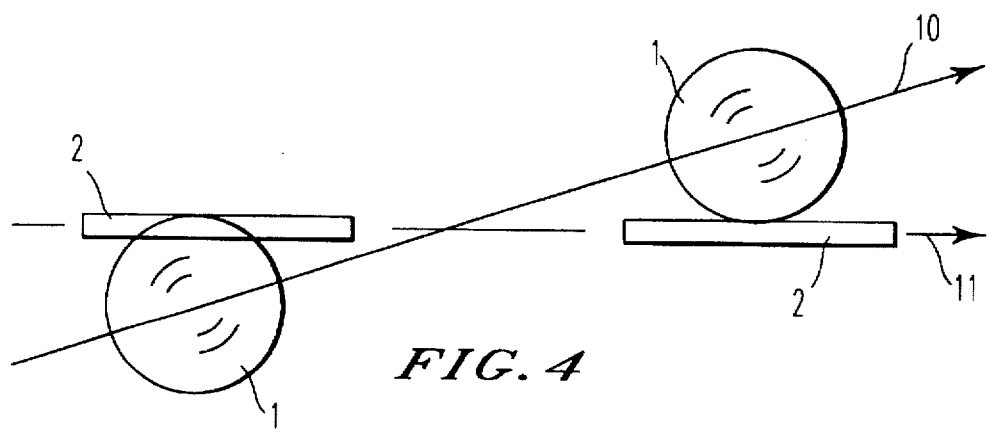
FIG. 4 is a front view showing the state of a shift between a base length and photoelectric conversion element arrays.
Figures 5A, 5B:
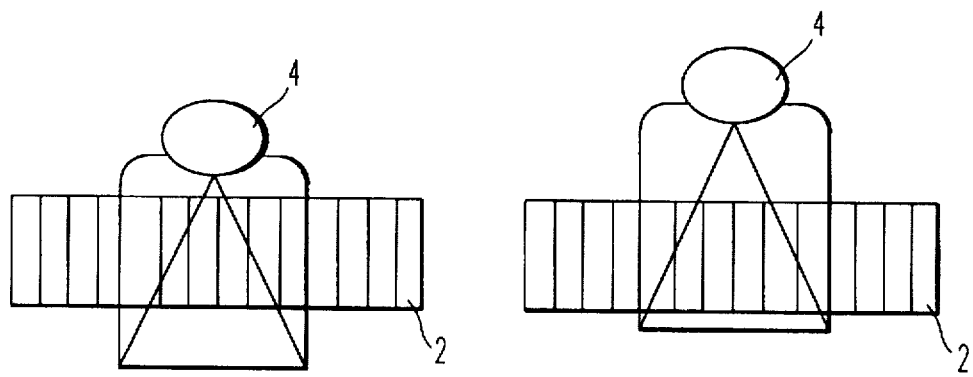
FIG. 5 is a front view showing an example of the images of a photographic subject projected on left and right photoelectric conversion element arrays as the result of the aforementioned shift.

Usually, in a case where the photoelectric conversion element arrays 2 are assembled into an optical distance measuring system, often the base length direction (image shift direction) 10 of the lenses 1 constituting an optical distance measuring system and the image shift quantity detecting direction 11 of the photoelectric conversion element arrays 2 are shifted and assembled, as shown in FIG. 4. If the shift quantity detecting direction 11 is shifted, the photographic subject images 4 of the photographic subject projected on the photoelectric conversion element arrays 2 will be shifted vertically from each other, as shown in FIG. 5. For this reason, the right and left photoelectric conversion element arrays 2 will photoelectrically convert the different portions of the photographic subject images 4, respectively. This phenomenon is specifically shown in FIGS. 6(a) and 6(b).

Figure 6A:
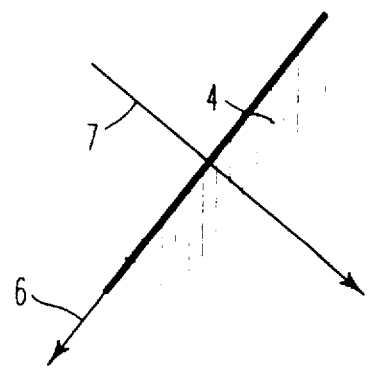
FIGS. 6(a)–6(c) are diagrams showing the contrast direction of the photographic subject and showing an example of the image outputs of the photoelectric conversion element arrays in both a case where there is a shift in the photoelectric conversion element arrays has a shift and a case where there is no shift.
Figure 6B:
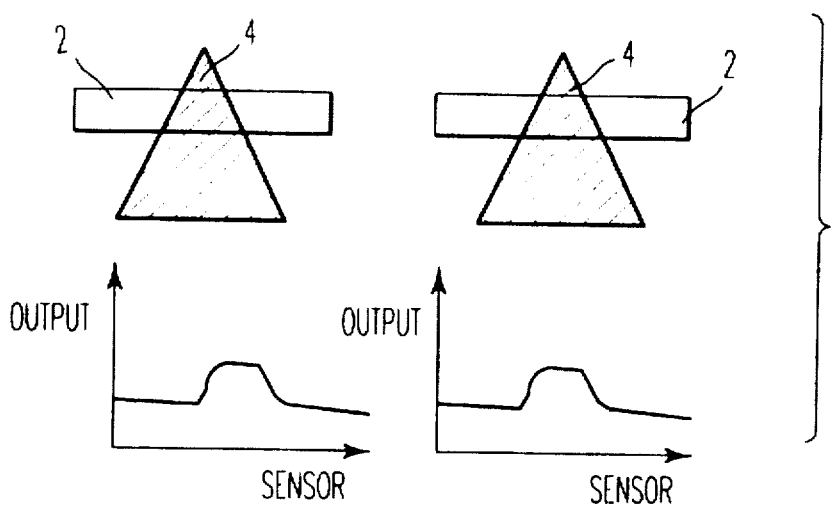

As shown in FIG. 6(a), the contrast varying portion of the photographic subject image 4 is projected on the photoelectric conversion element arrays 2. In other words, the direction of the edge portion of the contrast of the photographic subject image 4 is taken to be 6, and the varying direction of the contrast of the photographic subject image 4 crossing the direction 6 at right angles is taken to be 7. In a case where the optical distance measuring system and the photoelectric conversion element arrays 2 are ideally assembled and there is no shift between the base length direction 10 of the optical distance measuring system and the shift quantity detecting direction 11 of the photographic subject images 4 of the photoelectric conversion element arrays 2, the photographic subject images 4 of the photographic subject are projected on the left and right photoelectric conversion element arrays 2 without being vertically shifted from each other, as shown in FIG. 6(b). Therefore, the left and right photoelectric conversion element arrays 2 can photoelectrically convert the same portion of the photographic subject image.

Figure 6C:
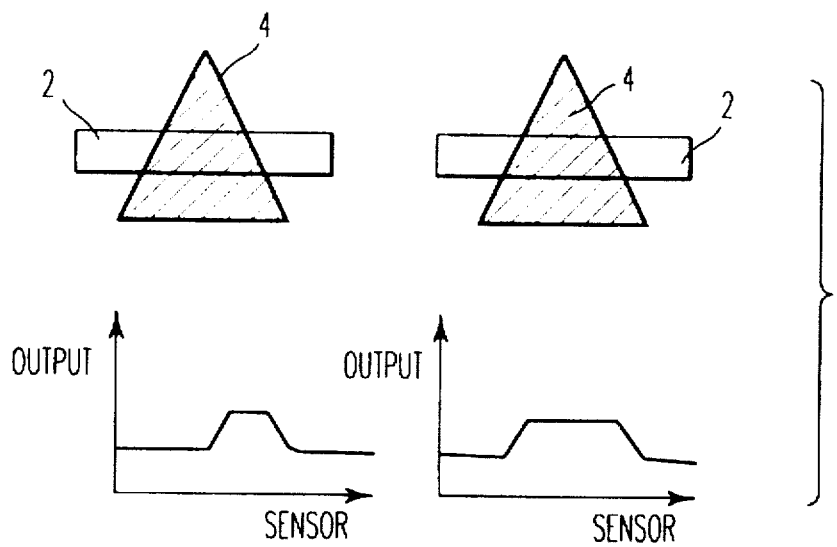

However, in a case where the base length direction 10 of the optical distance measuring system and the shift quantity detecting direction 11 of the photographic subject image of the photoelectric conversion element arrays 2 are mutually shifted and assembled, the photographic subject images 4 are vertically shifted from each other and projected on the left and right photoelectric conversion element arrays 2, as shown in FIG. 6(c). For this reason, the different portions of the photographic subject are photoelectrically converted, and as shown in the lower half part of FIG. 6(c), the image information outputs based on the left and right photographic subject images 4 are different from each other, so an accurate measurement of distance cannot be performed.

Then, the photoelectric conversion element arrays are constituted as shown in FIG. 2 so that accurate measurements of distance can be made by correcting the vertical shift of the photographic subject image which occurs when assembling, obtaining left and right image information outputs with no vertical shift, and detecting accurate left and right image shifts. The constitution will hereinafter be described in greater detail.

Figure 8:
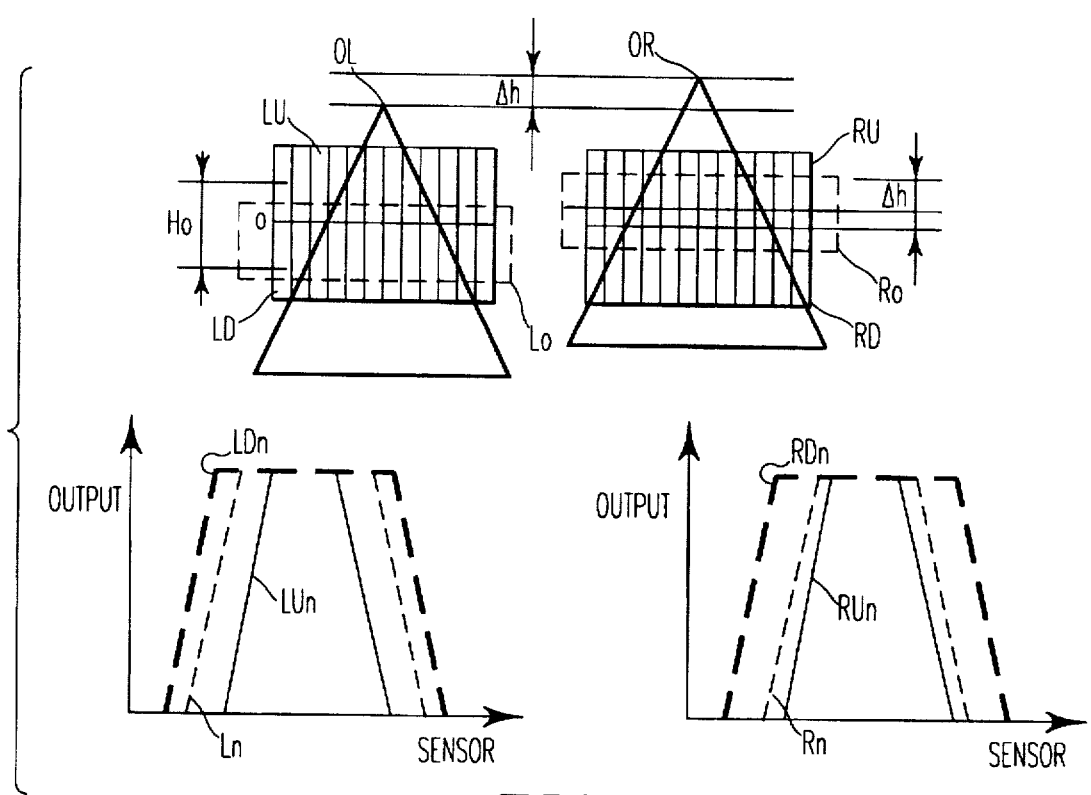
FIG. 8 is a diagram showing the photographic subject images on left and right photoelectric conversion element arrays and the outputs of the photoelectric conversion element arrays in a case where there is a shift in the left and right photoelectric conversion element arrays.

First, assume that the photographic subject images OL and OR, as shown in the upper half part of FIG. 8, have been vertically shifted by $\Delta h$ with respect to the upper and lower photoelectric conversion element arrays 2 arranged so as to have a space Ho (center pitch)(where $-Ho \geq \Delta h \geq Ho$).

The areas of the same portions of the photographic subject images, which are part of the photographic subject to be originally measured, become left and right areas Lo and Ro. These areas, as with the case of the shift between the photographic subject images, are vertically shifted by $\Delta h$. If the areas are shifted by $\Delta h$, the left and right areas would be the same portion with respect to the photographic subject even if an absolute position were anywhere. For convenience, assume that either part is shifted by $(\frac{1}{2})\Delta h$ with respect to the center 0 between the upper and lower photoelectric conversion element arrays. In this embodiment, the left and right areas Lo and Ro are shifted by $\Delta h$ by vertically shifting the left and right areas by $(\frac{1}{2})\Delta h$ with respect to the center 0, respectively.

Such areas Lo and Ro, as shown in FIG. 8, are positioned between the upper left photoelectric conversion element array LU and the lower left photoelectric conversion element array LD and between the upper right photoelectric conversion element array RU and the lower right photoelectric conversion element array RD, respectively. Therefore, if the image information of the photographic subject image varies linearly, an output can be predicted when a photoelectric conversion element is in the area Lo between the upper and lower photoelectric conversion arrays LU and LD. Also, when a photoelectric conversion element is in the area Ro between the upper and lower photoelectric conversion arrays RU and RD, the output can be predicted. In the illustrated embodiment, since two rows of photoelectric conversion element arrays are vertically disposed, the outputs of the photoelectric conversion element arrays can be predicted by first-order approximation. If a plurality of photoelectric conversion element arrays are vertically disposed, the output of the photoelectric conversion element arrays can be predicted accurately by n-order approximation.

The section, which generates the left and right image information of the same portion by using the upper and lower photoelectric conversion element arrays, is the image information generating section 3 shown in FIG. 2. Next, a description will be given of the constitution of the image information generating section 3. First, assume that the varying portion A of the contrast of the photographic subject has been inclined at an angle of $\theta$ for convenience. In this case, the left and right contrast varying portions A are shifted left and right as shown in FIG. 9, depending upon which part is photoelectrically converted between the upper and lower portions of the photographic subject image.

Thus, when the left and right photographic subject images are shifted, the left and right photoelectric conversion element arrays will not photoelectrically convert the same photographic subject portion and therefore an accurate measurement of distance cannot be made.

Figure 9:
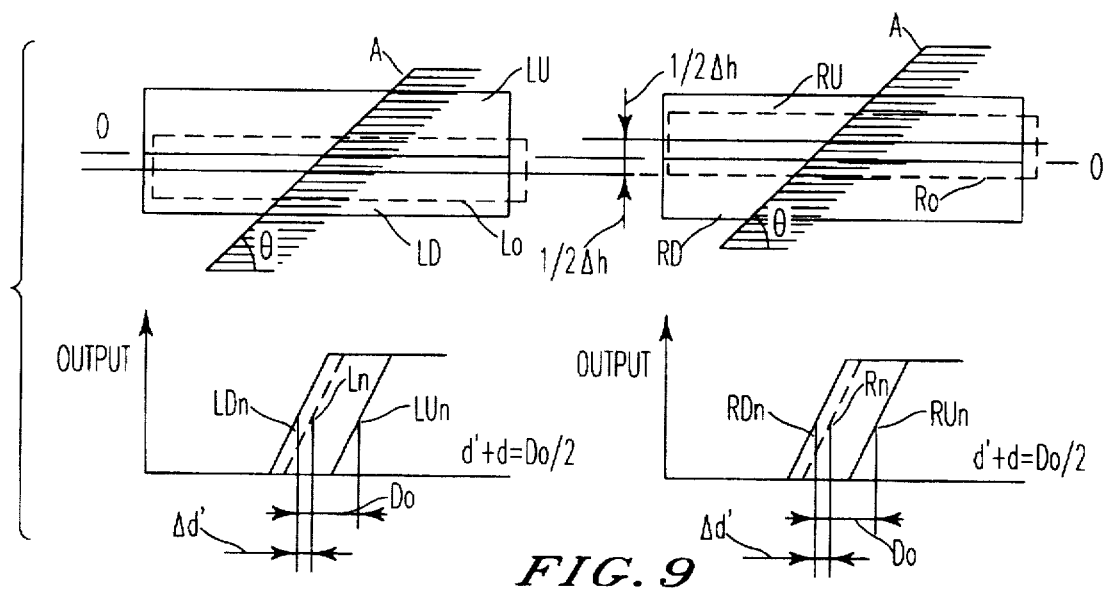
FIG. 9 is a diagram showing the relationship between the inclination of the contrast portion of the photographic subject image on the photoelectric conversion element array and the shift of the output of the photoelectric conversion element array in a case where there is no shift in left and right photoelectric conversion element arrays.
Figure 10:
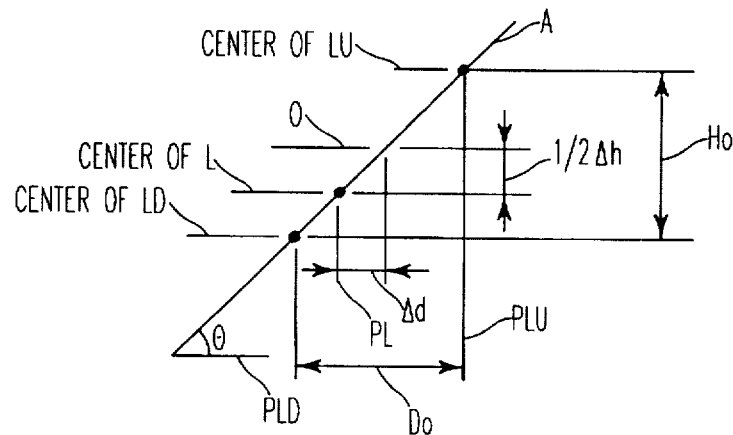
FIG. 10 is a diagram used for explaining calculation of the shift of the photographic subject image projected on the photoelectric conversion element array in a case where there is shift in left and right photoelectric conversion element arrays.

Now, the image output Ln of the same portion Lo of the photographic subject is calculated from the image outputs LUn and LDn of the photoelectric conversion element arrays LU and LD shown in FIG. 9. The shift quantity $\Delta d$ in the left and right directions of the image information corresponding to $(\frac{1}{2})\Delta h$ is calculated as shown in FIG. 10. When the varying portion A of the contrast is inclined by an angle of $\theta$, the shift quantity Do in the left and right directions of the photoelectric conversion element arrays LU and LD is determined by the angle of $\theta$.

$$Do = Ho/\tan\theta$$

Also, $\Delta d$ is obtained in the same way.

$$\Delta d = \{(\frac{1}{2})\Delta h\}/\tan\theta$$

Therefore, $$\Delta d = (\Delta h/2Ho)Do$$

Since the term of the inclination $\theta$ of the photographic subject portion is removed, $\Delta d$ becomes as follows:

$$\Delta d = (\Delta h/Ho) \cdot (Do/2) \quad (1)$$

Also, $\Delta h$ is an assembly error which occurs when manufacturing, as described above, and is a quantity which is determined by each distance measuring device. Therefore, if a ratio of $\Delta h$ to Ho is found, then $\Delta d$ can be calculated if Do is found.

Therefore, if the space Do, between the image outputs LDn and LUn shown in FIG. 9, is calculated, $\Delta d$ can be calculated from Equation (1). Furthermore, if the space Do between the image outputs LDn and LUn is found, the virtual image output Ln of the same portion Lo of the photographic subject can be calculated by shifting LDn and LUn. For example, if it is assumed that the image output LDn is shifted, the shift quantity $\Delta d'$ will become as follows:

$$\Delta d' = (Do/2) - \Delta d$$

$$\Delta d' = \{1 - (\Delta h/Ho)\} Do/2$$

Similarly, if Do is calculated for the right photoelectric conversion element arrays, $\Delta d$ or $\Delta d'$ can be calculated. Also, the direction of the shift of the image output is determined by the direction of the shift $\Delta h$ of the photographic subject image.

Figure 7:
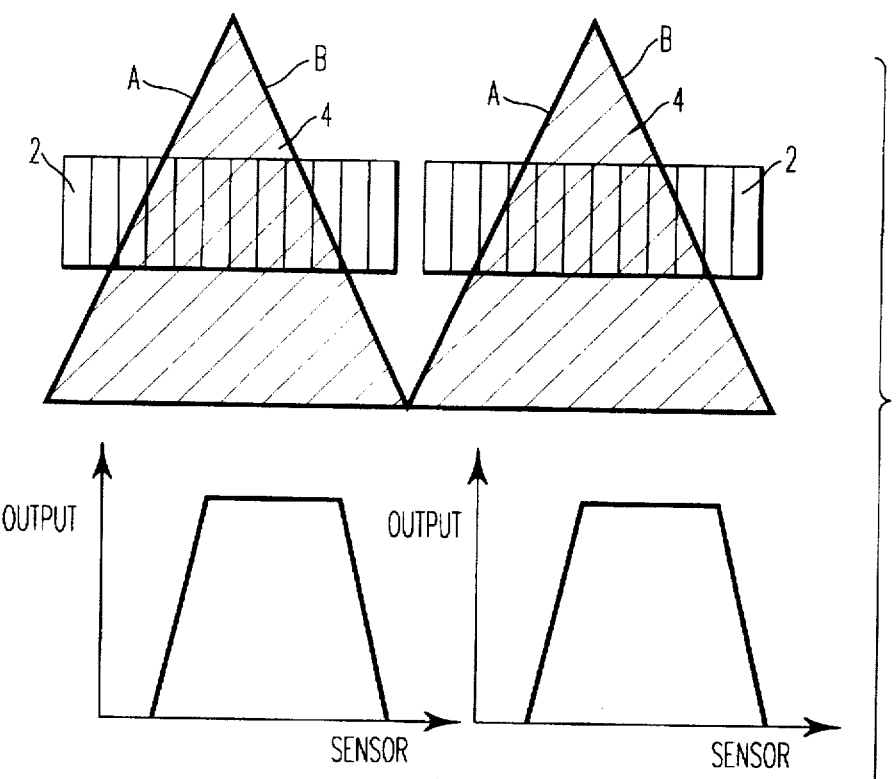
FIG. 7 is a diagram showing the photographic subject images on left and right photoelectric conversion element arrays and the outputs of the photoelectric conversion element arrays in a case where there is no shift in the left and right photoelectric conversion element arrays.
Figure 11:
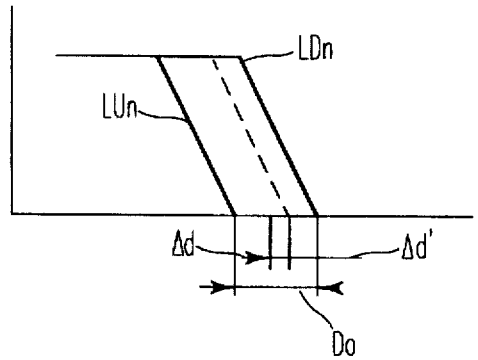
FIG. 11 is a diagram showing an example of the image outputs of the photoelectric conversion element array in a case where there is shift in left and right photoelectric conversion element arrays.

For example, when the right photographic subject image is shifted upper than the left photographic subject image, the left photographic subject image can be shifted to the side of the image output LD and the right photographic subject image can be shifted to the side of the image output RU. If the space Do, between the image outputs LDn and LUn, is likewise calculated for the B portion shown in FIG. 7, the assembly error $\Delta d$ can be calculated. The result is shown in FIG. 11.

The space Do, between the image outputs LDn and LUn, is determined by the inclination $\theta$ of the contrast varying portion of the photographic subject. That is, $Do = Ho/\tan\theta$. Therefore, when $\theta = 90°$, $Do = 0$. Therefore, Do is varied by the contrast varying portion of the photographic subject image projected on the photoelectric conversion element arrays, that is, the angle $\theta$ of the direction crossing at right angles with the direction in which the contrast varies. That is, because $\Delta h$ also varies, Do which is part of an image is obtained from the image outputs LDn, LUn, RDn, and RUn to calculate $\Delta d$, and Ln and Rn are calculated, whereby image information where the same portion of the photographic subject was photoelectrically converted can be reconstituted. By calculating an image shift quantity from the reconstituted image information, an accurate image shift quantity can be calculated.

Also, in order to calculate Do, the image outputs LDn, LUn, RDn, and RUn are calculated as a phase difference by using a normal correlative method, and a discrete result can be determined as a consecutive result by applying an interpolative method, etc. In this case, the correlative method and the interpolative method do not need to be additionally provided because they are used for calculating an image shift.

Figure 12:
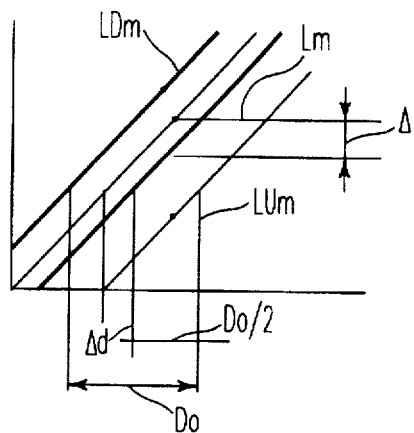
FIG. 12 is a diagram used for explaining that an output is obtained which approximates to an image output with no shift, when there is a shift between left and right photoelectric conversion element arrays and a shift occurs in the image output.

Next, a description will be given of a method where $\Delta d$ is approximated and obtained by a difference between values of the image information outputs in order to obtain the image information on the same portion shifted from the upper and lower image information by $\Delta d$. As shown in FIG. 12, when an image output Lm is calculated from left image outputs LDm and LUm, $$Do : \Delta d = (LUm - LDm) : \Delta \quad \Delta d = (\Delta d/Ho)(Do/2)$$

From this equation, $$\Delta = (\Delta d/Ho)\{(LUm - LDm)/2\}$$

Therefore, $$Lm = \Delta + \{(LUm - LDm)/2\}$$

From this equation, $$Lm = \{(\Delta h + Ho)/2Ho\}LUm + \{(Ho - \Delta h)/2Ho\}LDm$$

Therefore, if $$\{(\Delta h + Ho)/2Ho\} = K,$$

$$Lm = KLUm + (1-k)LDm$$

Thus, Lm can be represented by LUm and LDm.

K, as with $\Delta h/Ho$, is a constant value which is determined by each distance measuring device. Likewise, the right image information Rm on the same portion of the right photographic subject image is expressed as follows:

$$Rm = (1 - K)RUm + KRDm$$

Therefore, Rm can also be represented by RUm and RDm.

Figure 13:
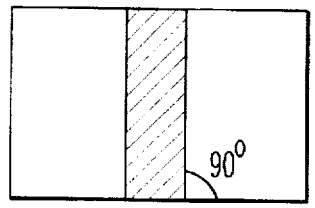
FIG. 13 is a front view showing an example of a chart for use in the distance measuring device of the present invention.

Next, a description will be given of a method of measuring $\Delta h/Ho$ which is a constant value that is determined by each distance measuring device. Japan Laid-Open Patent Publication No. HEI 4-27814 describes a method of measuring a vertical shift from the image shift in a case where distance is measured by using a chart of an inclination of 0° shown in FIG. 13 and from the image shift in a case where distance is measured by using a chart of an inclination of 45° shown in FIG. 14. This method is correct in principle but not practical. The reason is because the phase difference detecting direction of the photoelectric conversion element cannot be accurately set to right angles with respect to a chart of an inclination of 0° which becomes a reference. That is, since the optical distance measuring system and the photoelectric conversion element are originally separate parts and are assembled, it is not found strictly at which position the photoelectric conversion element is positioned.

Figure 14:
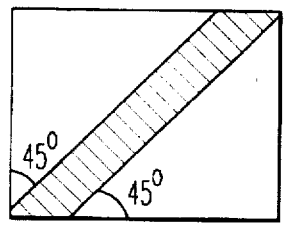
FIG. 14 is a front view showing an example of another chart for use in the distance measuring device of the present invention.
Figure 16:
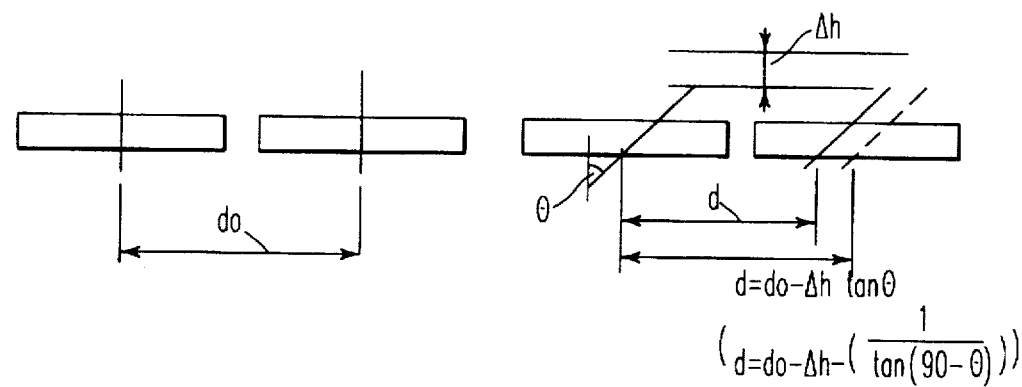
FIG. 16 is a diagram used for explaining that a difference is caused to occur in the results of distance measurements by the inclination of the photographic subject image projected on the photoelectric conversion element array.
Figure 17:
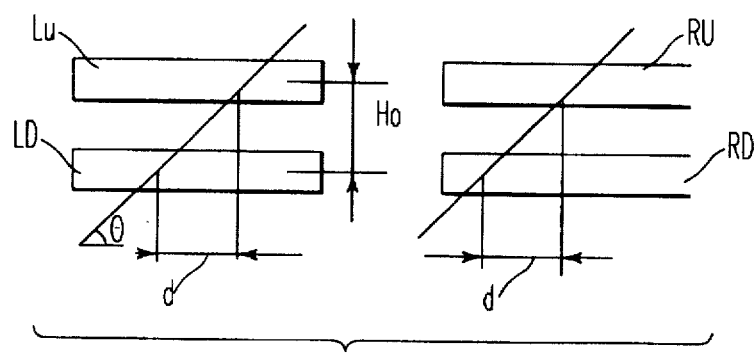
FIG. 17 is a diagram showing the relationship between the space between upper and lower photoelectric conversion element arrays and a photographic subject.

This will be further described in detail. As shown in FIG. 16, the image shift do when a measurement of distance is made by using the 0° chart of FIG. 13 and the image shift d when a measurement of distance is made by using the 45° chart of FIG. 14 are:

$$d = do - \Delta h \cdot \tan\theta \text{ (where } \theta = 45°\text{)}$$

From this equation, a difference between the measurement result of the 0° chart and the measurement result of the 45° chart is:

$$do - d = \Delta h \cdot \tan 45° = \Delta h$$

From this difference between the measurement results, a vertical shift can be obtained. However, in practice, the 0° chart and the photoelectric conversion element array do not become vertical to each other. For example, if it is assumed that there is an error of about 1°, the difference will become a difference between a chart of 1° and a chart of 46°

$$d1 - d46 = d0 - \Delta h \cdot \tan 1 - d0 + \Delta h \cdot \tan 46$$

$$d1 - d46 = \Delta h (\tan 46 - \tan 1) = 1.01808 \Delta h$$

Therefore, there is an error of about 2%.

Figure 15:
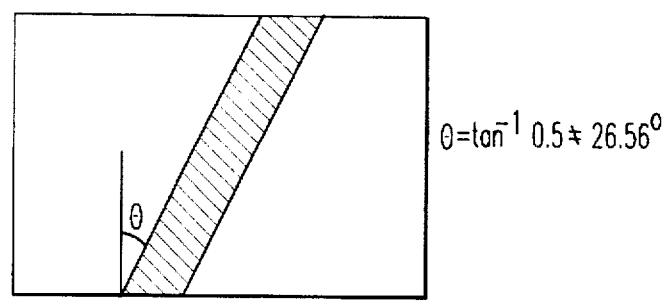
FIG. 15 is a front view showing an example of still another chart for use in the distance measuring device of the present invention.

Now, if the difference between the 0° chart and the 45° chart is not used but a difference, which is obtained when a chart of $\theta = \pm\tan^{-1} 0.5$ shown in FIG. 15 is used, is used, $$d(\tan^{-1} 0.5) - d(-\tan^{-1} 0.5) = \Delta h(2 \cdot \tan(\tan^{-1} 0.5)) = \Delta h$$

Furthermore, if it is assumed that the photoelectric conversion element array has an error of 1°, $$d(\theta+1)-d(-\theta+1)=\Delta h(0.5220\ldots+0.4783\ldots)=\Delta h\cdot 1.00038$$

Therefore, the error becomes an error of 0.038%, that is, an error of 1/47 of the error in prior art, and an error of 1° will become no problem.

Also, even when the aforementioned chart of ±45° is used and ½ of the difference is used, an error becomes small, but it is obvious that the aforementioned method can make the error smaller. Furthermore, if the θ of an arbitrary chart of ±θ is made small, by calculation the error can be reduced to:

$$(d(\theta+1)-d(-\theta+1))/(\tan\theta-\tan(-\theta))\approx\Delta h\ 1.00030$$

However, the error does not become small at the rate where a detection accuracy of Δh is reduced (i.e., at the rate where a value of $(d(\theta+1)-d(-\theta+1))$ becomes small). In addition, by the reason that $(\tan\theta-\tan(-\theta))$ needs to be calculated, $\pm\theta=\pm\tan^{-1}0.5$ is best. Likewise, for Ho, by projecting a chart of ±θ for LU, LD, RU, and RD, the image shift quantity, d, between LU and LD or the image shift quantity between RU and RD is obtained in the same way.

$$d=Ho\tan\theta$$

With this, (Δd/Ho) can be calculated.
Also, with this, $$1.00038\Delta h/1.00038Ho=\Delta d/Ho$$

Therefore, the aforementioned error is canceled. But, since Ho is determined by a patterning operation in a manufacturing process, it is better to use a constant value by measuring each Ho. Thus, if Δh/Ho is found by a constitution such as that shown in FIG. 2, an accurate measurement can be made.

Figure 18:
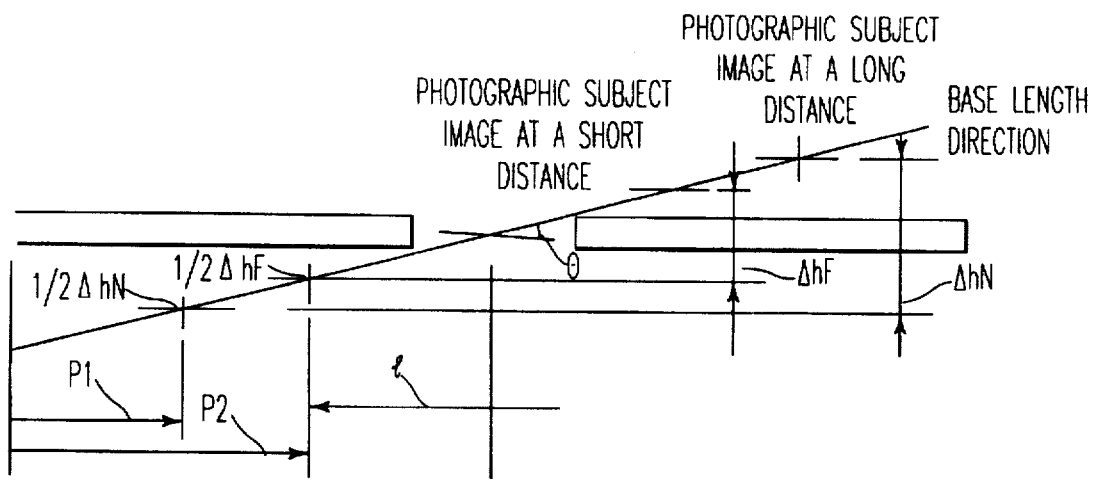
FIG. 18 is a diagram showing the relationship between a photographic subject at a short distance and a photographic subject at a long distance when there is a shift between the direction of a base length and the direction of left and right photoelectric conversion element arrays.

Also, as shown in FIG. 4, if the base length direction is different from the direction in which a shift is detected by the photoelectric conversion element array, then the shift of the photographic subject image will occur in the vertical direction, as described above. Therefore, the vertical shift of the photographic subject image of the photographic subject at a short distance differs from the vertical shift of the photographic subject image of the photographic subject at a long distance. Then, as shown in FIG. 18, Δh is measured by using a chart of ±θ at a short distance and Δh is also measured by using a chart of ±θ at a long distance. If it is assumed that ½Δh$_N$ and ½Δh$_F$ are distributed right and left, an accurate photographic subject image with no vertical shift can be made by changing Δh according to the position of the photographic subject image. That is, as shown in FIG. 18, Δh$_N$ is used at P1 and ½Δh$_F$ is used at P2, thereby generating the left image information. With respect to this, when a gain is represented by G, a shift by S, and a sensor address by P, the gain and the shift may be set in relation with the address of the photoelectric conversion element array, like Δh=G.P+S.

Also, without measuring Δh at two distances as described above, the inclination θ, between the base length direction and the detecting direction of the photoelectric conversion element array, can be calculated from Δh at a single distance and the position of the image.

$$\theta=\tan^{-1}(\Delta h/1)$$

where 1 represents the position of the image.

Therefore, the inclination θ can be calculated from a vertical image shift quantity Δh=1. tanθ at some other distance. However, the method using two distances can more accurately detect Δh which varies with the distance of the photographic subject.

Figure 19:
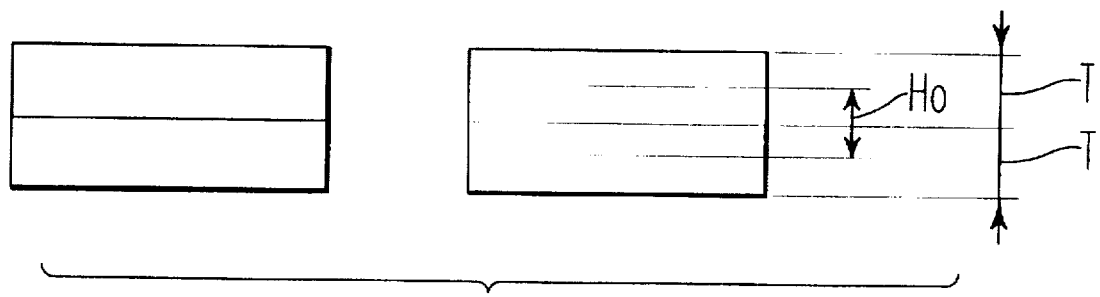
FIG. 19 is a front view showing the relationship between the space between upper and lower photoelectric conversion element arrays and the thickness of each photoelectric conversion element array.

When left and right photoelectric conversion element arrays are used in two rows, respectively, as in the illustrated embodiment, the contrast portion (direction which crosses at right angles with respect to a direction in which a contrast varies) needs to be nearly linear because the same portion of the photographic subject is predicted from the image information LDn and LUn of the left photoelectric conversion element arrays LD and LU by first-order approximation. When the contrast portion sharply varies in a curve, Ln cannot be accurately predicted. In a case where the photoelectric conversion element arrays consists of upper and lower element arrays as shown in FIGS. 1 and 8, the space Ho between upper and lower photoelectric conversion element arrays, shown in FIG. 19, cannot be made smaller than the thickness T of the photoelectric conversion element array (the width of the element array). If T is made too small in such an arrangement of the photoelectric conversion element arrays, then noise will be caused to occur by a small change in the photographic subject. Usually the aforementioned T has been set to four or five times the center pitch for enlarging a range of distance measurement in the vertical direction. For that reason, Ho becomes a large value, and in this Ho, the linearity of the aforementioned contrast portion cannot be expected.

Figure 20:
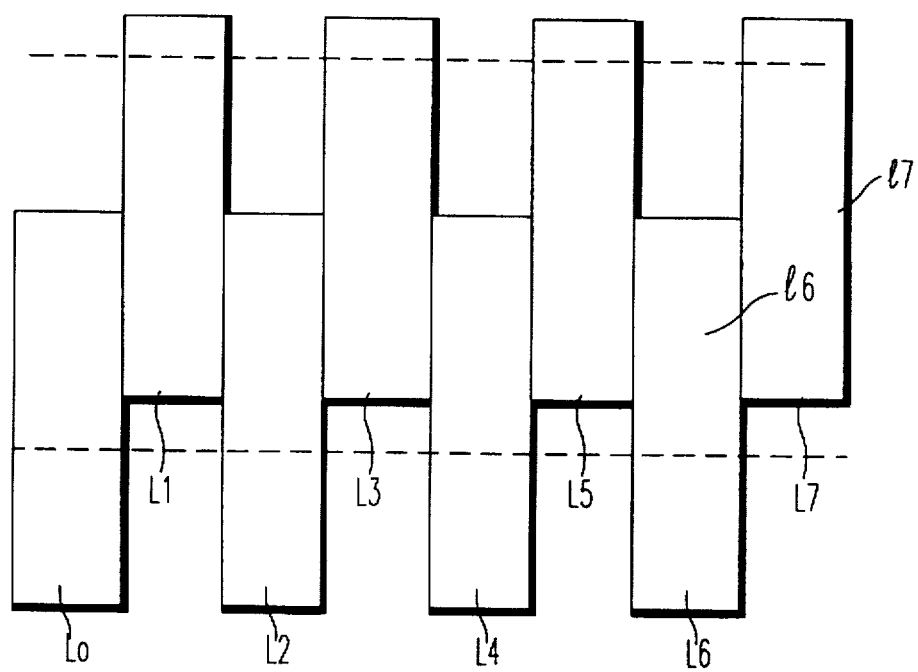
FIG. 20 is a front view showing an example of the arrangement of the elements of a photoelectric conversion element array applicable to the present invention.

Then, in the left photoelectric conversion element arrays LD and LU and the right photoelectric conversion element arrays RD and RU, as shown in FIG. 3, the odd element and the even element are shifted vertically from each other and are arranged in the form of a sinking comb. If done in this way, Ho can be made small while practically increasing the thickness T of the photoelectric conversion element array. The Ho is set to about the sensor pitch P of the photoelectric conversion element arrays LD and LU. With this setting, even for a photographic subject where the contrast portion is inclined at an angle of about 45°, even in a distance measuring device where Δh has been shifted vertically by about 1 center pitch, calculation becomes easy because Δh has been shifted left and right by 1 center pitch, as described above. If Δh is shifted more than 1 center pitch, it will be shifted right and left and calculated and will need to be searched. If Δh is within 1 center pitch, there will be no problem. As shown in FIG. 20, in a case where upper sensors (elements) L1, L3, L5, and L7 and lower sensors L0, L2, L3, L4, and L6 are vertically shifted and arrayed, the Δh of the upper sensor between L1 and L3 is predicted as (L1+L3)/2. In this case, if Lo≤(Li+L3)/2≤L4. It can be judged that Δh is within 1 center pitch.

Figure 22:
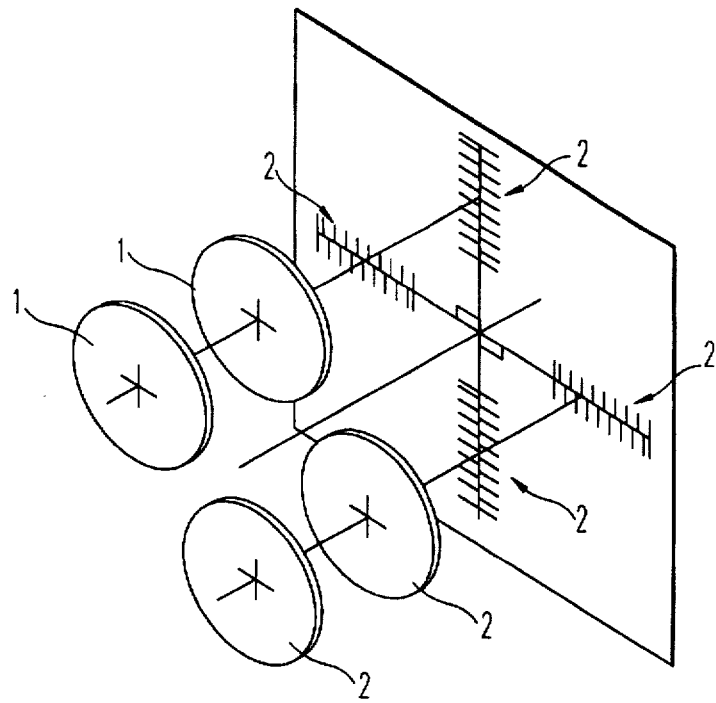
FIG. 22 is a perspective view showing another embodiment of the distance measuring device according to the prevent invention.

For a photographic subject which has many contrast portions inclined at an angle of more than 45°, a measurement of distance should not be made because there is little correlation between the upper and lower portions. In such a case, it is desirable that a warning be sent out as described later or it is desirable that, as shown in FIG. 22, photoelectric conversion element arrays be arranged in the form of a cross and a distance be measured with the vertical photoelectric conversion element arrays. In a distance measuring device such that Δh is shifted more than 1 sensor pitch, the same portion of a photographic subject which is predicted is generated by using upper and lower sensors adjacent to each other (e.g., in FIG. 20, sensor L0 or L4 when sensor L2 is considered). Therefore, in a distance measuring device such that Δh is vertically shifted more than 1 sensor pitch, prediction will become uncertain.

Now, a description will be given of the image generation of the same portion, such as 11 through Ln.

As described above, $$Lm=\{(LDm+LUm)/2\}+(\Delta h/Ho)\cdot\{(LDm-LUm)/2\}$$

If $\Delta h/Ho=k$, in the case of L1 the following equation is substituted.

$$LDm=(Lo+L2)/2$$

From $LUm=L$, $$l1=(L0+L2)/4+L1/2+k\{(L1/2)-(L0+L2)/4\}$$

$$l1=(¼)\{L0+L2+2L1-k(L0+L2-2L1)\}$$

Similarly, in the case of 12, $$l2=(L2/2)+(L1+L3)/4+k\{(L1+L3)/4-(L2/2)\}$$

$$l2=(¼)\{L1+L3+2L2+k(L1+L3-2L2)\}$$

In general, $l_m=(¼)(L_{m-1}+L_{m+1}+2Lm)+(-1)^m(k/4)(L_{m-1}+L_{m+1}+2L_m)$

By using the upper and lower sensors of an arrangement such as that shown FIG. 20, the output ln of the same portion can be generated.

Similarly, for the right photoelectric conversion element arrays, the output rm of the same portion of the photographic subject is obtained as follows.

$$Rm=\{(RDm+RUm)/2\}+(\Delta h/Ho)\cdot\{(RDm-RUm)/2\}$$

From this equation and $\Delta h/Ho=k$, $$r_m=(¼)(r_{m-1}+r_{m+1}+2r_m)+(-1)^m(k/4)(r_{m-1}+r_{m+1}+2r)$$

Thus, by using the upper and lower photoelectric conversion element arrays of an arrangement such as that shown FIG. 20, the image information of the same portion of a photographic subject can be generated with accuracy and simplicity.

Figure 21:
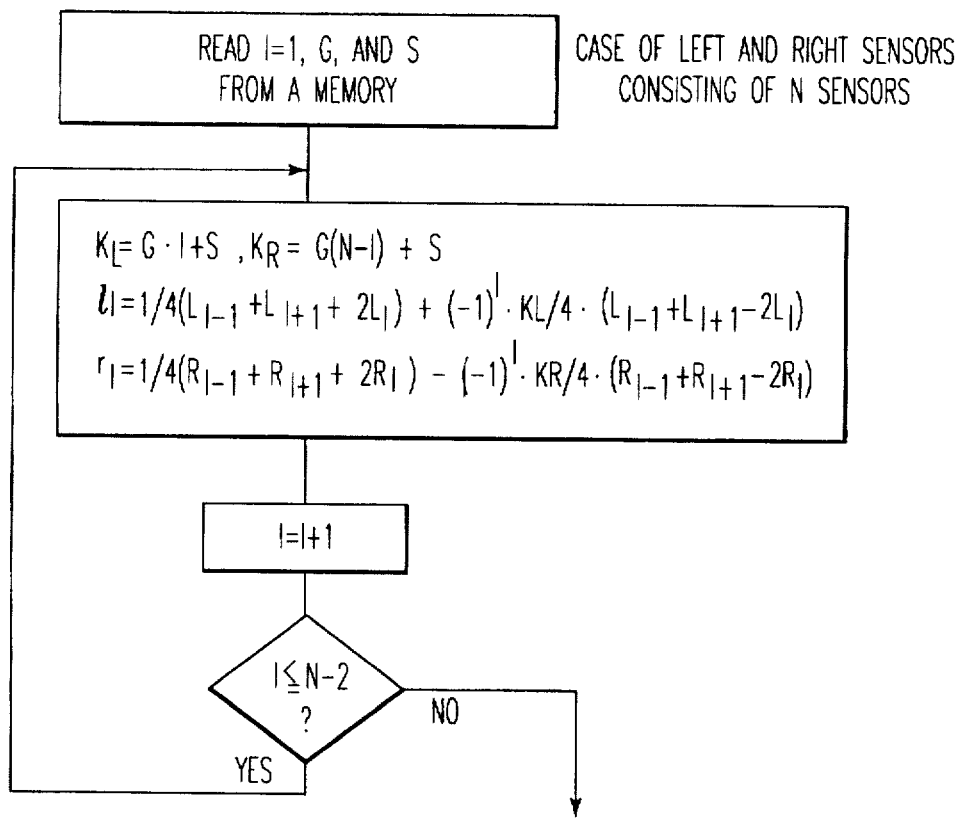
FIG. 21 is a flowchart showing an example of generation of image information applicable to the present invention.

FIG. 21 is a flowchart of the image information generation in the aforementioned image information generating section 3. If it is assumed that photoelectric conversion element arrays are arranged left and right in a form such as the one shown in FIG. 20, then the coefficient values G and S of a correction function corresponding to the vertical shift quantity $\Delta h/Ho$ of the photographic subject image will be read out of a memory such as an electrically erasable programmable read-only memory. The G and S, as described above, are coefficients which are obtained by measuring distance by using a chart of $\pm\tan^{-1}0.5$ at two distances, and as described above, correction functions, $K_L=G1+S$ and $KR=G(N-1)+S$, are generated in correspondence with the position of the photoelectric conversion element array.

Next, the left and right image outputs, $L_I$ and $R_I$, of the same portion of the photographic subject image will be generated. This calculation is made from I=1 to I=N−2 to obtain (N−1) left image outputs and (N−1) right image outputs. The left and right image outputs, generated by the image information generating section, are the same portion of the photographic subject with no vertical shift. Therefore, by detecting the shift between the left and right photographic subject images from the left and right image outputs by a general correlative method, an accurate measurement of distance can be performed.

Now, assume as shown in FIG. 22 that four pairs of photoelectric conversion element arrays 2 are arranged in the form of a cross and that lenses 1 constituting an optical distance measuring system are arranged on the cross line. In this case, according to the aforementioned conventional technique, the base length direction needs to be aligned with the detecting direction of the photoelectric conversion element arrays, as in the case where photoelectric conversion element arrays are arranged horizontally. Furthermore, four lenses 1 constituting an optical distance measuring system are often formed into a united body. Therefore, even if the horizontal lenses of the four lenses were aligned, a shift would occur in a vertical direction if there is a manufacturing error in the vertical base length direction. Therefore, to accurately measure distance both in the horizontal direction and in the vertical direction, it is necessary to form four lenses 1 independently and adjust the respective lenses individually, so an adjusting operation becomes troublesome.

On the other hand, if the technical ideas of the present invention are applied, the image of the same portion of the photographic subject image with no shift will be virtually generated and used for measuring distance. Therefore, the four lenses, shown in FIG. 22, may be formed integrally with each other, and the aforementioned adjustment of the lenses may be roughly made. In addition, according to the distance measuring device where four pairs of photoelectric conversion element arrays are arranged in the aforementioned way, the angles of the contrast portions in the vertical and horizontal directions of a photographic subject can be detected with respect to photoelectric conversion element arrays. Therefore, distance can be measured with a high degree of accuracy by selecting and using a contrast portion which has a smaller angle.

In addition, even in a conventional distance measuring device where photoelectric conversion element arrays are horizontally arranged, distance can be measured more accurately by applying the technical ideas of the present invention to the conventional device and when it is judged that the inclination of the contrast portion is large, giving a warning so that the photographic device is changed from the horizontal position to the vertical position. The present invention is applicable to all sorts of passive types, for example, an external light triangle distance measuring type and a TTL phase difference distance measuring type.

Thus, in accordance with the present invention, an accurate measurement of distance could be performed without undergoing the vertical shift of a photographic subject even if the photographic subject had contrast portions consisting of inclinations of various kinds, because the image information of the same portion of the photographic subject is obtained and then used for measuring distance.

Furthermore, according to the present invention, the odd and even elements constituting a single photoelectric conversion element array are vertically shifted. Therefore, as compared with a conventional device where upper and lower photoelectric conversion element arrays are arranged in a row, respectively, the space between the upper and lower lines can be made small and image information where vertical correlation is more accurately approximated can be obtained, so an accurate measurement of distance can be made. In addition, when photoelectric conversion element arrays are constructed by using CCDs, transfer lines consisting of upper and lower photoelectric conversion element arrays can be connected to one side of a photoelectric conversion element array as a single line, so the present invention has the advantageous effect that arrangement of transfer lines becomes easy and that no DC step occurs.

Furthermore, according to the present invention, in the arrangement where the odd and even elements constituting of a single photoelectric conversion element array are vertically shifted, as described above, the space, between upper and lower photoelectric conversion element arrays, is nearly the same as the pitch of the elements constituting the upper and lower photoelectric conversion element arrays. Therefore, when the inclination of the contrast portion of a photographic subject image is 45°, the image is shifted right and left by 1 element pitch and it can be easily detected whether the photographic subject is inclined at an angle of 45°. For a portion which is inclined at an angle of more than 45 degrees, vertical correlation and measurement accuracy of distance are reduced. Therefore, when it is detected that a photographic subject is inclined at an angle of more than 45 degrees, image information is not used and a countermeasure, such as a warning, is taken, whereby a measurement of distance can be made with a higher degree of accuracy.

Furthermore, according to the present invention, the calculation in the image information generating section can also be used for the image shift calculating section, so there is no need of providing calculating sections separately.

Furthermore, according to the present invention, a phase difference, between the image outputs of upper and lower photoelectric conversion element arrays, is detected by approximating the size of the outputs of the upper and lower photoelectric conversion element arrays, so there is the advantage that calculation becomes easy.

Furthermore, according to the present invention, the image information of the same portion of a photographic subject is obtainable only by multiplying the image outputs of upper and lower photoelectric conversion element arrays by a correction value, and complicated calculation is unnecessary for obtaining the space between the image outputs of upper and lower photoelectric conversion element arrays, so there is the advantage that calculation becomes simple.

Furthermore, according to the present invention, the vertical shift of a photographic subject is calculated by the result of the measurement obtained by measuring distance by a predetermined chart, so an accurate image output can be obtained.

Furthermore, according to the present invention, left and right errors are independently corrected by a function which corresponds to the physical position of photoelectric conversion element arrays. Therefore, the influence, caused by a vertical shift, could be accurately corrected even if the distances of a photographic subject were different.

Furthermore, according to the present invention, the inclination of the contrast portion of a photographic subject can be detected. Therefore, when a photographic subject which is difficult to measure, such as a horizontal line, is detected, an alarm, for example, is given so that a device is changed from the horizontal position to the vertical position. This can prevent the failure of making an inaccurate measurement of distance.

Moreover, according to the present invention, pairs of photoelectric conversion element arrays in two or more rows are arranged horizontally and vertically in the form of a cross and optical distance measuring systems are arranged in correspondence with these photoelectric conversion element arrays, so a distance measuring device with higher accuracy is obtainable.

Finally, according to the present invention, in the arrangement photoelectric conversion element arrays in two or more rows are arranged horizontally and vertically in the form of a cross, as described above, a measurement of distance is performed by using a contrast portion whose inclination is smaller, so distance can be measured more accurately.

What is claimed is:

1. A distance measuring device where measurement of a distance up to a photographic subject or detection of a focal point of an optical photographic system is performed by detecting a shift quantity between a pair of left and right photographic subject images formed by a pair of left and right optical distance measuring systems having base length, said distance measuring device comprising:

at least a first pair of upper and lower photoelectric conversion element arrays and a second pair of upper and lower photoelectric conversion element arrays arranged with respect to said pair of photographic subject images for detecting said pair of photographic subject images of the same portion of said photographic subject;

an image information generating section for generating image information in the same direction as an image shift direction between the photographic subject images of the same portion of said photographic subject by processing left image information and right image information converted photoelectrically by said at least first and second pairs of upper and lower photoelectric conversion element arrays; and an image shift quantity detecting section for detecting a shift quantity between the photographic subject images of the same portion of said photographic subject, based on a pair of left image information and right image information generated by said image information generating section;

said measurement of a distance up to a photographic subject or said detection of a focal point of an optical photographic system being performed based on the shift quantity detected by said image shift quantity detecting section.

2. A distance measuring device where measurement of a distance up to a photographic subject or detection of a focal point of an optical photographic system is performed by detecting a shift quantity between a pair of left and right photographic subject images formed by a pair of left and right optical distance measuring systems having a base length said distance measuring device comprising:

a plurality of upper and lower photoelectric conversion element arrays arranged with respect to said pair of photographic subject images for detecting said pair of photographic subject images of the same portion of said photographic subject;

an image information generating section for generating image information in the same direction as an image shift direction between the photographic subject images of the same portion of said photographic subject by processing left image information and right image information converted photoelectrically by said plurality of upper and lower photoelectric conversion element arrays: and an image shift quantity detecting section for detecting a shift quantity between the photographic subject images of the same portion of said photographic subject based on a pair of left image information and right image information generated by said image information generating section:

said measurement of a distance up to a photographic subject and said detection of a focal point of an optical photographic system being performed based on the shift quantity detected by said image shift quantity detecting section:

wherein each array of said plurality of upper and lower photoelectric conversion element arrays is arranged so that odd and even elements are alternately shifted vertically.

3. The distance measuring device as set forth in claim 2, wherein a vertical shift quantity, between the elements of the photoelectric conversion element array, is nearly the same as a pitch between the odd elements or between the even elements.

4. A distance measuring device where measurement of a distance up to a photographic subject or detection of a focal point of an optical photographic system is performed by detecting a shift quantity between a pair of left and right photographic subject images formed by a pair of left and right optical distance measuring systems having a base length said distance measuring device comprising:

a plurality of upper and lower photoelectric conversion element arrays arranged with respect to said pair of photographic subject images for detecting said pair of photographic subject images of the same portion of said photographic subject;

an image information generating section for generating image information in the same direction as an image shift direction between the photographic subject images of the same portion of said photogaphic subject by processing left image information and right image information converted photoelectrically by said plurality of upper and lower photoelectric conversion element arrays; and an image shift quantity detecting section for detecting a shift quantity between the photographic subject images of the same portion of said photographic subject based on a pair of left image information and right image information generated by said image information generating section;

said measurement of a distance up to a photographic subject and said detection of a focal point of an optical photographic system being performed based on the shift quantity detected by said image shift quantity detecting section;

wherein said image information generation section uses a correlative method with respect to left and right image outputs of upper photographic conversion elements and lower photographic conversion elements, for each portion, and wherein the image information of the same portion of the photographic subject is obtained by a space between images of each portion obtained from upper image information and lower image information and a correction value determined by each distance measuring device.

5. A distance measuring device where measurement of a distance up to a photographic subject or detection of a focal point of an optical photographic system is performed by detecting a shift quantity between a pair of left and right photographic subject images formed by a pair of left and right optical distance measuring systems having a base length said distance measuring device comprising:

a plurality of upper and lower photoelectric conversion element arrays arranged with respect to said pair of photographic subject images for detecting said pair of photographic subject images of the same portion of said photographic subject;

an image information generating section for generating image information in the same direction as an image shift direction between the photographic subject images of the same portion of said photographic subject by processing left image information and right image information converted photoelectrically by said plurality of upper and lower photoelectric conversion element arrays; and an image shift quantity detecting section for detecting a shift quantity between the photographic subject images of the same portion of said photographic subject, based on a pair of left image information and right image information generated by said image information generating section;

said measurement of a distance up to a photographic subject and said detection of a focal point of an optical photographic system being performed based on the shift quantity detected by said image shift quantity detecting section:

wherein said image information generating section approximates a space between upper image information and lower image information for a value of the upper image information and a value of the lower image information for generating image information of the photographic subject image of the same portion by the upper image information of the same portion of the photographic subject by a correction value which is determined by each distance measuring device.

6. The distance measuring device as set forth in claim 5, wherein, by using upper image information LUm and RUm, lower image information LDm and RDm, and a value K which is determined by adjustment shift of the distance measuring device, the image information Lm and the image information Rm of the same portion of the photographic subject image are expressed as:

$$Lm=KLUm+(1-K)LDm, Rm=(1-K)RUm+KRDm.$$

7. A distance measuring device where measurement of a distance up to a photographic subject or detection of a focal point of an optical photographic system is performed by detecting a shift quantity between a pair of left and right photographic subject images formed by a pair of left and right optical distance measuring systems having a base length. said distance measuring device comprising:

a plurality of upper and lower photoelectric conversion element arrays arranged with respect to said pair of photographic subject images for detecting said pair of photographic subject images of the same portion of said photographic subject;

an image information generating section for generating image information in the same direction as an image shift direction between the photographic subject images of the same portion of said photographic subject by processing left image information and right image information converted photoelectrically by said plurality of upper and lower photoelectric conversion element arrays; and an image shift quantity detecting section for detecting a shift quantity between the photographic subject images of the same portion of said photographic subject, based on a pair of left image information and right image information generated by said image information generating section;

said measurement of a distance up to a photographic subject and said detection of a focal point of an optical photographic system being performed based on the shift quantity detected by said image shift quantity detecting section;

wherein a vertical shift quantity ah between the photographic subject images or a space Ho between the upper and lower photoelectric conversion element arrays is calculated from a result of measurement obtained by using a chart of vertical stripes and lines inclined at an angle of $\pm\tan^{-1}0.5$.

8. A distance measuring device where measurement of a distance up to a photographic subject or detection of a focal point of an optical photographic system is performed by detecting a shift quantity between a pair of left and right photographic subject images formed by a pair of left and right optical distance measuring systems having a base length, said distance measuring device comprising:

- a plurality of upper and lower photoelectric conversion element arrays arranged with respect to said pair of photographic subject images for detecting said pair of photographic subject images of the same portion of said photographic subject;
- an image information generating section for generating image information in the same direction as an image shift direction between the photographic subject images of the same portion of said photographic subject by processing left image information and right image information converted photoelectrically by said plurality of upper and lower photoelectric conversion element arrays; and
- an image shift quantity detecting section for detecting a shift quantity between the photographic subject images of the same portion of said photographic subject based on a pair of left image information and right image information generated by said image information generating section;
- said measurement of a distance up to a photographic subject and said detection of a focal point of an optical photographic system being performed based on the shift quantity detected by said image shift quantity detecting section;
- wherein, with a correction value K at the image information generating section, an address I representative of N photoelectric conversion elements arranged horizontally and vertically, and correction coefficients G and S, left and right correction functions are expressed asL $$K_L = GI + S,$$

and $$K_R = G(N-1) + S$$

and image information is generated by independently correcting the left image information and the right image information by these correction functions.

9. The distance measuring device as set forth in claim 3, wherein, when it is judged that the photographic subject has a large number of contrast portions whose inclination exceeds 45 degrees, an instruction is given so that a photographic device, provided with the distance measuring device, is changed to its vertical position for measuring distance.

10. A distance measuring device where measurement of a distance up to a photographic subject or detection of a focal point of an optical photographic system is performed by detecting a shift quantity between a pair of left and right photographic subject images formed by a pair of left and right optical distance measuring systems having a base length said distance measuring device comprising:

- a plurality of upper and lower photoelectric conversion element arrays arranged with respect to said pair of photographic subject images for detecting said pair of photographic subject images of the same portion of said photographic subject;
- an image information generating section for generating image information in the same direction as an image shift direction between the photographic subject images of the same portion of said photographic subject by processing left image information and right image information converted photoelectrically by said plurality of upper and lower photoelectric conversion element arrays; and
- an image shift quantity detecting section for detecting a shift quantity between the photographic subject images of the same portion of said photographic subject, based on a pair of left image information and right image information generated by said image information generating section;
- said measurement of a distance up to a photographic subject and said detection of a focal point of an optical photogrphic system being performed based on the shift quantity detected by said image shift quantity detecting section;
- wherein upper and lower photoelectric conversion element arrays in two or more rows are arranged horizontally and vertically in the form of a cross, and in correspondence with these arrays, optical distance measuring systems are arranged in the form of a cross.

11. The distance measuring device as set forth in claim 10, wherein, between a distance measuring device in a horizontal direction and a distance measuring device in a vertical direction, there is used a result of measurement of a distance measuring device where many contrast portions of a photographic subject having a small angle with respect to the photoelectric conversion element arrays are distributed.

* * * * *